US008255784B2

(12) United States Patent
Masui (10) Patent No.: US 8,255,784 B2
(45) Date of Patent: Aug. 28, 2012

(54) INFORMATION PROCESSING APPARATUS, INFORMATION PROCESSING SYSTEM, COMPUTER READABLE MEDIUM STORING CONTROL PROGRAM, INFORMATION PROCESSING METHOD, AND IMAGE PROCESSING APPARATUS

(75) Inventor: Takanori Masui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 820 days.

(21) Appl. No.: 11/725,441

(22) Filed: Mar. 20, 2007

(65) Prior Publication Data

US 2008/0047020 A1    Feb. 21, 2008

(30) Foreign Application Priority Data

Aug. 16, 2006  (JP) .................................. 2006-221950

(51) Int. Cl.
*G06F 17/00* (2006.01)
(52) U.S. Cl. ........................ 715/200; 358/402
(58) Field of Classification Search .................. 715/200, 715/255; 358/403, 468, 402; 345/403, 468
See application file for complete search history.

(56) References Cited

U.S. PATENT DOCUMENTS

| 5,838,459 A * | 11/1998 | Hashimoto .................... 358/402 |
| 5,872,638 A * | 2/1999 | Haze ............................. 358/405 |
| 6,268,926 B1 * | 7/2001 | Okimoto et al. ............. 358/1.15 |
| 6,449,062 B1 * | 9/2002 | Endo ............................. 358/400 |
| 6,771,820 B1 * | 8/2004 | Oakeson ....................... 382/232 |
| 6,874,124 B2 * | 3/2005 | Murase et al. ................ 715/255 |
| 6,987,580 B2 * | 1/2006 | Watanabe et al. ............ 358/1.15 |
| 7,006,259 B1 * | 2/2006 | Takaoka ........................ 358/405 |
| 7,171,456 B2 * | 1/2007 | Honma et al. ................ 709/219 |
| 7,274,476 B2 * | 9/2007 | Eguchi et al. ................ 358/1.15 |
| 7,594,173 B2 * | 9/2009 | Matsumoto ................... 715/255 |
| 7,672,003 B2 * | 3/2010 | Dowling et al. ............. 358/1.15 |
| 7,676,512 B2 * | 3/2010 | Yamamoto et al. ........... 707/608 |
| 7,802,175 B2 * | 9/2010 | Wagner et al. ............... 715/200 |
| 7,853,866 B2 * | 12/2010 | Tanaka ......................... 715/205 |
| 7,940,411 B2 * | 5/2011 | Henry et al. ................. 358/1.15 |
| 7,984,027 B2 * | 7/2011 | Tamura ......................... 707/694 |
| 8,174,717 B2 * | 5/2012 | Tanimoto ..................... 358/1.15 |
| 2001/0016857 A1 * | 8/2001 | Sorihashi ...................... 707/511 |
| 2002/0029197 A1 * | 3/2002 | Kailamaki et al. ............. 705/40 |
| 2002/0143882 A1 * | 10/2002 | Matsushita et al. .......... 709/206 |

(Continued)

FOREIGN PATENT DOCUMENTS

JP      A-06-105024      4/1994

(Continued)

OTHER PUBLICATIONS

Johnson et al., Steganalysis: The Investigation of Hidden Information, IEEE 1998, pp. 1-4.*

(Continued)

*Primary Examiner* — Cong-Lac Huynh
(74) *Attorney, Agent, or Firm* — Oliff & Berridge, PLC (57) ABSTRACT

An aspect of the present invention provides an information processing apparatus including a transmission setting accepting unit that accepts transmission setting for an electronic document to be transmitted; a transmitting unit that transmits the electronic document; a setting unit that sets information to be concealed in information used in the transmission; and a log creation unit that creates a transmission log in which the information set by the setting unit is concealed.

21 Claims, 9 Drawing Sheets

U.S. PATENT DOCUMENTS

| | | | |
|---|---|---|---|
| 2002/0157028 A1* | 10/2002 | Koue et al. | 713/202 |
| 2003/0037006 A1* | 2/2003 | Maruyama et al. | 705/59 |
| 2003/0117665 A1* | 6/2003 | Eguchi et al. | 358/402 |
| 2003/0145212 A1* | 7/2003 | Crumly | 713/186 |
| 2003/0193689 A1* | 10/2003 | Nakagawa | 358/1.15 |
| 2003/0233429 A1* | 12/2003 | Matte et al. | 709/221 |
| 2004/0062243 A1* | 4/2004 | Zhang et al. | 370/392 |
| 2004/0064690 A1* | 4/2004 | Yu et al. | 713/156 |
| 2004/0098480 A1* | 5/2004 | Sekizawa | 709/224 |
| 2004/0133516 A1* | 7/2004 | Buchanan et al. | 705/42 |
| 2004/0193428 A1* | 9/2004 | Fruchter et al. | 704/276 |
| 2005/0088676 A1* | 4/2005 | Kitada et al. | 358/1.11 |
| 2005/0097171 A1 | 5/2005 | Hikichi | |
| 2005/0179935 A1* | 8/2005 | Ogura et al. | 358/1.14 |
| 2005/0235163 A1* | 10/2005 | Forlenza et al. | 713/193 |
| 2006/0007471 A1* | 1/2006 | Okamoto et al. | 358/1.14 |
| 2006/0069918 A1* | 3/2006 | Takahashi et al. | 713/176 |
| 2006/0072144 A1* | 4/2006 | Dowling et al. | 358/1.15 |
| 2006/0103879 A1* | 5/2006 | Matsushima | 358/1.15 |
| 2006/0232811 A1* | 10/2006 | Yokoyama | 358/1.14 |
| 2006/0246884 A1* | 11/2006 | Ansari | 455/419 |
| 2006/0253536 A1 | 11/2006 | Fujiwara et al. | |
| 2007/0022462 A1* | 1/2007 | Kojima | 725/135 |
| 2007/0029394 A1* | 2/2007 | Wicker et al. | 235/494 |
| 2007/0242282 A1* | 10/2007 | Hashimoto | 358/1.2 |
| 2008/0104501 A1* | 5/2008 | Sattler et al. | 715/224 |
| 2008/0168277 A1* | 7/2008 | Forlenza et al. | 713/189 |
| 2010/0036822 A1* | 2/2010 | Riley et al. | 707/3 |
| 2010/0149593 A1* | 6/2010 | Dowling et al. | 358/1.15 |

FOREIGN PATENT DOCUMENTS

| | | |
|---|---|---|
| JP | A-11-316638 | 11/1999 |
| JP | A 2002-41250 | 2/2002 |
| JP | A-2004-153501 | 5/2004 |
| JP | A-2004-247319 | 9/2004 |
| JP | A-2004-304292 | 10/2004 |
| JP | A-2005-158038 | 6/2005 |

OTHER PUBLICATIONS

Dafelmair, Improvements in Process Control Dependability throgh Internet Security Technology, Google 2000, pp. 321-332.*

Johnson et al., Steganalysis: The Investigation of Hidden Information, IEEE 1998, pp. 113-116.*

Keatley, Good Laboratory Practice Consideration for Electronic Records, Google 2002, pp. 86-97.*

* cited by examiner

| | 150 | 152 | 154 | 156 | 158 |
|---|---|---|---|---|---|
| 144 → | NAME | TELEPHONE NUMBER | FAX NUMBER | MAIL ADDRESS | PUBLIC KEY CERTIFICATE |
| 166 | AAA | 012-345-6789 | 012-345-6790 | aaa@abc.jp | ISSUED |
| 162 | BBB | 023-456-7890 | 023-456-7891 | bbb@efg.jp | NOT ISSUED |
| 164 | CCC | | | ccc@hij.jp | ISSUED |
| 166 | DDD | 056-789-0123 | 056-789-0124 | ddd@klm.jp | NOT ISSUED |

212 — 2006.7.10 10:32.22 e-mail From uuu@abc.jp To aaa@abc.jp File scan23
214 — 2006.7.10 10:45.38 fax From 03-4567-8901 To 056-789-0124 File scan24
216 — 2006.7.10 11:01.09 e-mail From uuu@abc.jp To XXXXXXXXX File scan27
218 — 2006.7.10 13:03.15 e-mail From XXXXXXXXX To XXXXXXXXX File XXXXXXXX

INFORMATION PROCESSING APPARATUS, INFORMATION PROCESSING SYSTEM, COMPUTER READABLE MEDIUM STORING CONTROL PROGRAM, INFORMATION PROCESSING METHOD, AND IMAGE PROCESSING APPARATUS

CROSS-REFERENCE TO RELATED APPLICATIONS

This application is based on and claims priority under 35 USC 119 from Japanese Patent Application No. 2006-221950 filed on Aug. 16, 2006.

BACKGROUND

The present invention relates to an information processing apparatus, an information processing system, a computer readable medium storing a control program, an information processing method, and an image processing apparatus.

SUMMARY

According to an aspect of the present invention, an information processing apparatus includes a transmission setting accepting unit that accepts transmission setting for an electronic document to be transmitted; a transmitting unit that transmits the electronic document; a setting unit that sets information to be concealed in information used in the transmission; and a log creation unit that creates a transmission log in which the information set by the setting unit is concealed.

BRIEF DESCRIPTION OF THE DRAWINGS

Exemplary embodiments of the present invention will be described in detail based on the following figures, wherein.

DETAILED DESCRIPTION

An exemplary embodiment of the present invention will be illustrated hereinafter.

Figure 1:
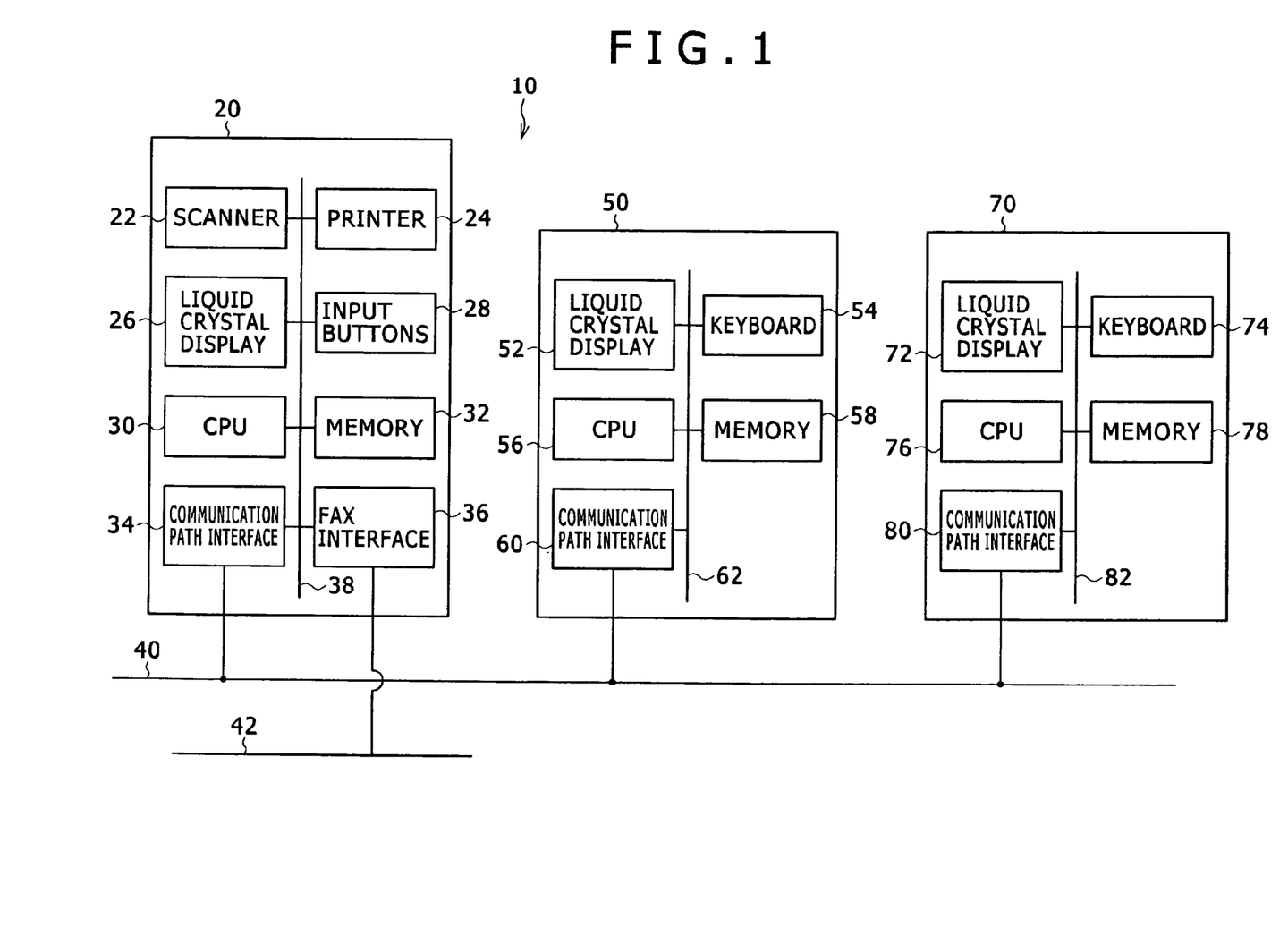
FIG. 1 is a block diagram outlining an example of a hardware configuration of the information processing system.

FIG. 1 is a block diagram outlining a hardware configuration of an information processing system 10 relevant to the exemplary embodiment. The information processing system 10 includes an image processing apparatus 20, a user authentication server 50, and a personal address book server 70.

The image processing apparatus 20 is an information processing apparatus equipped with a printer function, a scan function, and a copy function using these functions, and also equipped with a transmitting function over FAX and Internet lines. An apparatus called a complex machine may be a type of such information processing apparatus. The image processing apparatus 20 may be personally used by a single user, but it may typically be installed at an office, a convenience store and the like, and used by plural specific or unspecific users.

In particular, the image processing apparatus 20 includes a scanner 22, a printer 24, a liquid crystal display 26, input buttons 28, a CPU 30, a memory 32, a communication path interface 34, a FAX interface 36, and a bus 38 for interconnecting these constituent parts.

The scanner 22 is a device that creates an electronic document by optically reading paper pages. The printer 24 is a device that prints pages on paper based on an electronic document. A copy may be produced by printing a page by the printer 24 based on an electronic document created by the scanner 22. The liquid crystal display 26 is a display that serves as a user interface (UI) of the image processing apparatus 20 and displays user-selectable commands, an operating status, and others. The input buttons 28 constitute an input device for the UI of the image processing apparatus 20 and may be provided as mechanical buttons or touch panel buttons appearing on the liquid crystal display 26.

The CPU 30 is a device that controls the operations of the hardware components of the image processing apparatus 20. The memory 32 may be composed of a semiconductor memory, a hard disk, and others and stores programs and data. The communication path interface 34 is an interface for communication with a remote machine via the Internet 40. The image processing apparatus 20 is capable of several types of communication such as communication on e-mail and communication on HTTP through the communication path interface 34. The FAX interface 36 is an interface for FAX communication over a telephone line network 42.

The user authentication server 50 is a device that may carry out password authentication, card authentication, biometric authentication, and others to verify whether a user who is going to use the image processing apparatus 20 and the personal address book server 70 is a true user. The user authentication server 50 may be configured by use of a personal computer (PC) or the like. The user authentication server 50 includes a liquid crystal display 52, a keyboard 54, a CPU 56, a memory 58, a communication path interface 60, and a bus 62 for interconnecting these components. The liquid crystal display 52 and the keyboard 54 are devices which are used for display and input, respectively, and constitute a UI of the user authentication server 50. The CPU 56 is a device that controls the operations of the components of the user authentication server 50. The memory 58 may be composed of a semiconductor memory, a hard disk, and others and retains data for user authentication in addition to storing programs and data. The communication path interface 60 is connected to the Internet 40 and controls communication with the image processing apparatus 20 and the personal address book server 70.

The personal address book server 70 serves as a device for storing contact address books and manages personal address books. The personal address book server 70 is constructed in the same hardware configuration as the user authentication server 50 and includes a liquid crystal display 72, a keyboard 74, a CPU 76, a memory 78, a communication path interface 80, and a bus 82 for interconnecting these components. A feature of the personal address book server 70 is that personal address books are stored in the memory 78. The personal address books are referred to from the image processing apparatus 20 through the communication path interface 80 and the Internet 40. The personal address book server 70 may store the personal address books of plural users or store a personal address book of a single user. The personal address book server 70 may be built using the same hardware as the user authentication server 50.

Figure 2:
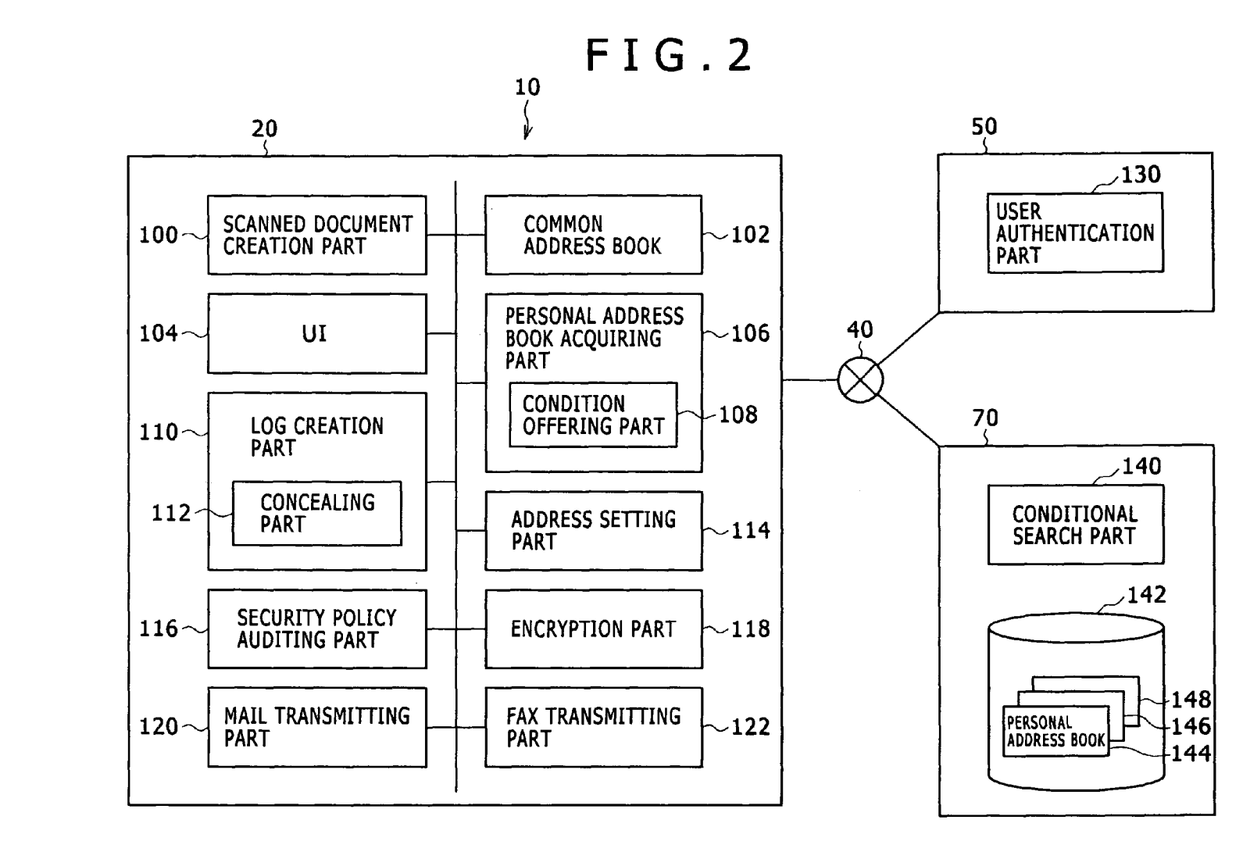
FIG. 2 is a block diagram schematically showing an example of an arrangement of functions in the information processing system.

FIG. 2 is a block diagram schematically showing an arrangement of functions in the information processing system 10. The functions shown are realized by program control of the hardware shown in FIG. 1. Program control is typically carried out in such a way that control programs installed in the memories 32, 58, 78 govern the operations of the corresponding CPUs 30, 56, 76. These control programs may be incorporated into computer products at the shipment from a factory or may be installed via a storage medium or a communication path.

The image processing apparatus 20 is functionally built up of a scanned document creation part 100, a common address book 102, a UI 104, a personal address book acquiring part 106, a log creation part 110, an address setting part 114, a security policy auditing part 116, an encryption part 118, a mail transmitting part 120, and a FAX transmitting part 122.

The scanned document creation part 100 scans a paper document using the scanner 22 and creates an electronic document (scanned document). A scanned document may be used as an electronic document to be transmitted to a remote machine as well as it may be printed.

The common address book 102 is a list of contact addresses which can be referred to from any user who uses the image processing apparatus 20 and stored in the memory 32. In the common address book 102, addresses (contact addresses) which are used for types of communication, such as FAX numbers and Uniform Resource Locators (URLs) are described.

The UI 104 is built up with the liquid crystal display 26 and the input buttons 28 and used by a user to input an operating command to the image processing apparatus 20 or obtain information from the image processing apparatus 20. The user can specify an electronic document for transmission via the UI 104. By operating the UI 104, the user can set a destination (address) of transmission by referring to the common address book 102 or the personal address book or directly entering the destination address. The image processing apparatus 20 may be operated from a remote machine (e.g., PC) connected to the Internet 40, for example.

The personal address book acquiring part 106 acquires an address book personally owned by a user of the image processing apparatus 20. The personal address book may be a local address book stored in the memory 32 (of the image processing apparatus) or a remote address book stored on a remote machine such as the personal address book server 70.

In the personal address book acquiring part 106, a condition providing part 108 is present. The condition providing part 108 provides a condition to be met by addresses that can be set as a destination address to the personal address book server 70 from which a personal address book is acquired. The provision of such condition can be performed, for example, once the user has specified a mode of transmission.

The condition to be met by addresses that can be set as a destination address is objectively determined according to setting for transmission. For example, if e-mail transmission is performed, the condition is that an e-mail address needs to be specified and, thus, addresses for other communication protocols, such as a FAX number, are rejected as they are contradictory to the condition. If encrypted e-mail transmission is performed, the condition is that a public key certificate required for encryption can be acquired. If security policies for restricted transmission are set (e.g., setting paths for which transmission is enabled, setting paths for which transmission is disabled), conditions satisfying the security policies are provided. The provision of the conditions may be replaced by transmitting the security policies themselves to the personal address book server 70, if an agreement has been established between the apparatus and the server. Restriction of transmission on FAX can be specified with particular FAX numbers and also can be specified with a toll number, a country code, and the like. Restriction of transmission on e-mail can be specified with particular e-mail addresses and also can be specified with a domain name and the like.

The log creation part 110 creates a time-sequential record (log) in which electronic document transmissions are recorded cumulatively. Also, the log creation part 110 can create a log in which copy operations are recorded cumulatively. The log is normally created so that all users can make reference to it. Although general header items of a transmission and a copy operation are commonly stored into the log, the log may include all data relevant to an electronic document to be transmitted or copied.

In the log creation part 110, a concealing part 112 is present. The concealing part 112 provides protection on user information so that information related to a user does not leak out to other users via the log created. Here, the information related to a user is what should be called a user's private information; i.e., information to identify the user or information owned by the user. The information to identify the user includes the user's name, the user's mail address, etc. The information owned by the user is information managed by the user as the owner. A user's private information is often set inaccessible to other users, because of its great privacy. Even if a user's private information is accessible to other users, its use may be restricted by inhibiting other users from handling the information as the owner does. For example, setting an e-mail address of a user for the source of e-mail is usually inhibited by someone other than its true owner.

For example, in a situation where a user has a personal address book as the user's private information and an address from this personal address book is set for a destination, the concealing part 112 operates to protect the address in the log. By way of example, the protection may provided by deleting the address to be protected from the log or encrypting the address. The encryption may be performed so that it can be decrypted by the transmitting user, but cannot be decrypted by general users. If a privileged user (having an administrator privilege) exists, the encryption may be performed so that it can be decrypted by this privileged user. It can be carried out that information is protected by creating an additional transmission log that can be referred to only by users to whom the information does not need to be concealed, such as the transmitting user and the privileged user. By way of example, concealment may be carried out as follows: in an additional transmission log, items are not concealed (neither deleted nor encrypted), but the log is concealed (for example, its read right is granted only to the users to whom the information does not need to be concealed) whereas, in a transmission log accessible to general users, the items are concealed, but the log itself is not concealed.

The address setting part 114 sets destination and source addresses and sets the transmission of an electronic document to be transmitted. Typically, the destination is set, based on user entry via the UI 104. As the source address, a contact address predetermined for the user is set.

The security policy auditing part 116 audits the operation of the image processing apparatus 20 in accordance with security policies. The security policies are data of predetermined rules related to the security of the image processing apparatus 20. By way of example, the predetermined rules for communication may include restricting logins from remote machines, restricting remote machines with which the apparatus communicates, restricting communication protocols, etc. The security policy auditing part 116 ensures the security of the image processing apparatus 20 by regulating the operation (inhibiting or conditionally inhibiting events against the policies) in accordance with the security policies.

The encryption part 118 performs encryption using public key cryptosystem, electronic signature, etc. for communication with a remote machine. In the public key cryptosystem, typically, a public key certificate issued by a certificate authority is used. An address for which a public key certificate cannot be acquired is judged improper as a destination of communication.

The mail transmitting part 120 transmits via e-mail an electronic document for which transmission on e-mail to a destination has been set by the address setting part 114 to the destination. The FAX transmitting part 122 transmits via FAX an electronic document for which transmission on FAX has been set by the address setting part 114. After a transmission via FAX of an electronic document by the FAX transmitting part 122, an e-mail for confirming that the transmission on FAX has been completed may be transmitted to the user who instructed the transmission via FAX. In this case, the e-mail for confirmation can also be recorded into the log created by the log creation part 110 and a part of its related information can be concealed by the concealing part 112.

On the user authentication server 50, a user authentication part 130 using Lightweight Directory Access Protocol (LDAP) is built. In response to a query from the image processing apparatus 20 and the personal address book server 70, the user authentication part 130 verifies whether a user who is accessing (logging into) these machines is a true user. For the verification, the user authentication part 130 compares data for authentication registered beforehand in the memory 58 with input data for matching. Once the true user has been authenticated, the authentication server transmits to the true user URL data for accessing the user's personal address book (the address, on the communication network of the personal address book server 70 and its internal bus).

On the personal address book server 70, a conditional search part 140 and an address book storing part 142 are present. The function of the conditional search part 140 is performed by the CPU 76 under the control of a program stored in the memory 78. The conditional search part 140 retrieves a set of personal addresses meeting a search condition provided from the condition providing part 108 of the image processing apparatus 20. The address book storing part 142 is configured with the memory 78 and plural personal address books 144, 146, 148 . . . are stored in the memory 78. Normally, accessing and reading (or issuing an instruction to read) the personal address books 144, 146, 148 . . . can be performed by a true owner authenticated by user authentication, but reference to them cannot be made by other users. One or plural personal addresses are contained in each personal address book 144, 146, 148.

Figure 3:
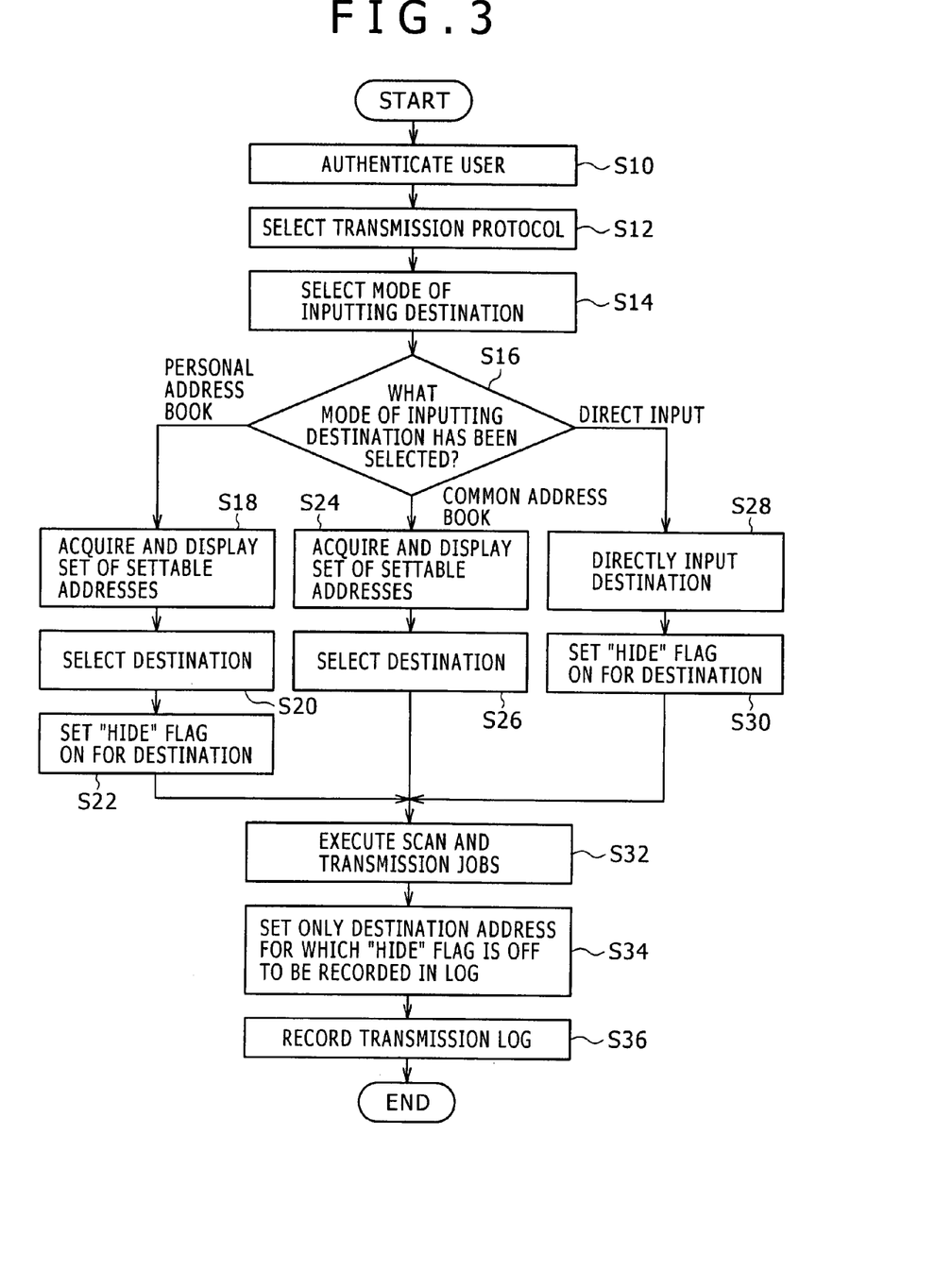
FIG. 3 is a flowchart describing a flow of processing in the image processing apparatus.

Then, referring to a flowchart of FIG. 3, the operation of the information processing system 10 is described.

FIG. 3 is a flowchart describing a flow of processing in the image processing apparatus 20. First, a user inputs a login name and a password to the image processing apparatus 20 via the UI 104 and logs in, after the user is authenticated by user authentication at the user authentication server 50 (S10) When transmitting an electronic document, the user selects a transmission protocol (S12) and selects a mode of inputting a destination (S14) by operating the UI 104. The image processing apparatus 20 judges the mode of inputting a destination (S16).

If a personal address book is used, the personal address book acquiring part 106 sends a request to provide a set of addresses for communication using the selected transmission protocol and meeting the security policies via the condition providing part 108 to the personal address book server 70. At the personal address book server 70, the conditional search part 140 retrieves a set of addresses meeting such condition from the personal address books stored in the address book storing part 142. The personal address book acquiring part 106 acquires and displays the extracted set of addresses on the UI 104 (S18). The user selects a desired address as a destination from the set of addresses displayed (S20). The address setting part 114 sets this address as the destination and sets a "hide" flag on for the destination (S22).

Otherwise, if a destination is input from a common address book, a set of settable addresses from among the addresses contained in the common address book 102 is displayed on the UI 104 (S24). When the user selects a destination address from this set of addresses, the address setting part 114 sets this address as the destination (S26). However, the "hide" flag is set off, because all addresses contained in the common address book 102 can naturally be referred to by all users.

If information necessary for transmission is directly input, the address setting part 114 sets a user-entered address as the destination (S28) and sets the "hide" flag on for the destination (S30).

After the destination is set, the image processing apparatus 20 executes scan and transmission processing. That is, the scanned document creation part 100 creates an electronic document to be transmitted by executing a scan of the document and the mail transmitting part 120 or the FAX transmitting part 122 transmits the electronic document to the set destination. At the transmission, the security policy auditing part 116 audits whether the destination conforms to the security policies. Creating the scanned document may be performed before setting the destination.

The log creation part 110 creates a transmission log in which a transmission time stamp, a source, a destination, etc. are described. For the destination, however, only the destination address for which the "hide" flag is off is set to be recorded (S34). That is, the destination address for which the "hide" flag is on is not recorded in the transmission log, and the destination address for which the "hide" flag is off, the source address, and other information are recorded as the transmission log (S36).

By means of FIGS. 4 through 7, further details are described, using concrete examples.

Figure 4:
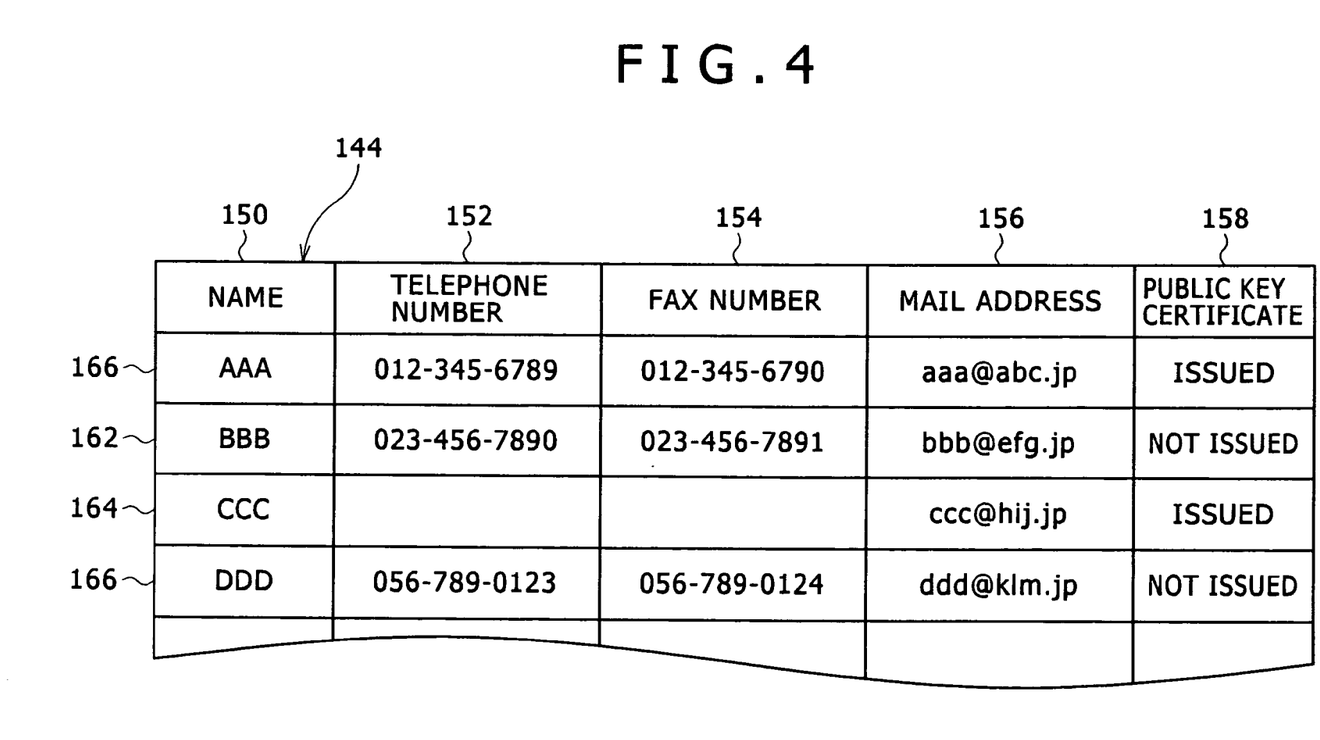
FIG. 4 illustrates an example of a personal address book.

FIG. 4 illustrates an example of a personal address book 144 mentioned in FIG. 2. In the personal address book 144, fields for name 150, telephone number 152, fax number 154, mail address 156, and public key certificate 158 are provided. In the shown example, the entries for four persons labeled 160, 162, 164, 166 are registered.

Concretely, for a person with the name of AAA, telephone number "012-345-6789", FAX number "012-345-6790", mail address "aaa@abc.jp" are registered, and "issued" in the public key certificate field indicates that the public key certificate associated with this mail address can be acquired. For a person with the name of BBB, telephone number, FAX number, and mail address are registered, but no public key certificate can be acquired. For a person with the name of CCC, telephone number and FAX number are not registered, but mail address is registered and the string indicating that public key certificate can be acquired is set. For a person with the name of DDD, telephone number, FAX number, and mail address are registered, but no public key certificate can be acquired, like BBB.

In this way, one of plural addresses for different communication protocols can be set user by user in the personal address book 144. In the personal address book 144, data that is used for encrypted communication or data by which it is determined whether encrypted communication is enabled or disabled, like "issued" or "not issued" in the public key certificate field, can be registered. Other entries such as membership information as to whether the person belongs to an organization (company, user group, etc.) and regional information as to whether the person belongs to a region (country and prefectural and city governments and the like) may be registered into the personal address book.

Figure 5:
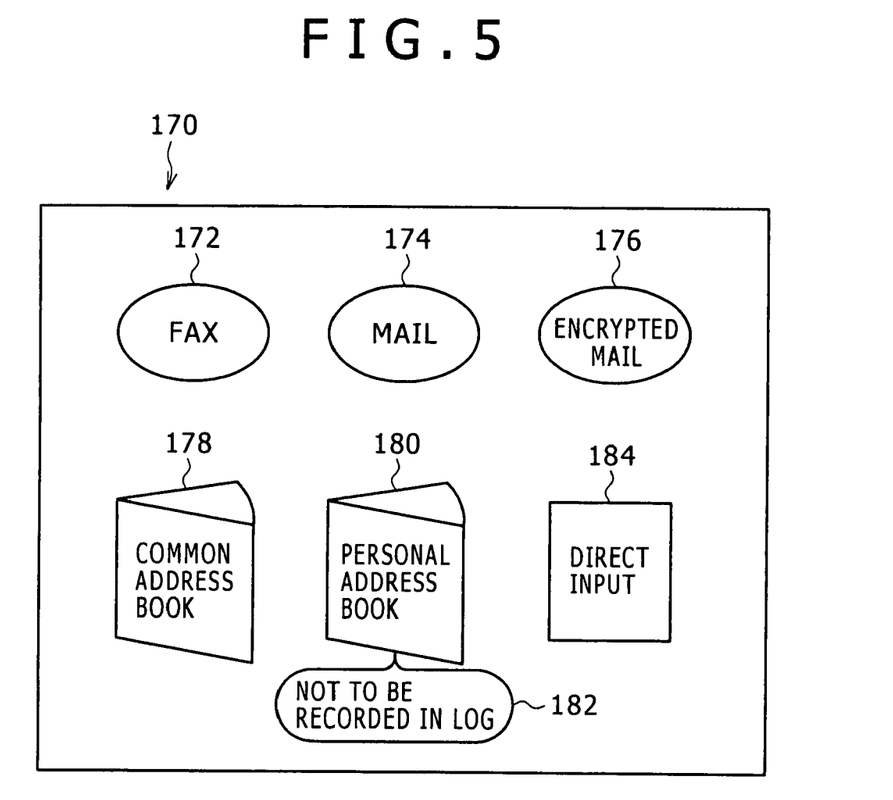
FIG. 5 illustrates an example of display on the UI screen.
Figure 6:
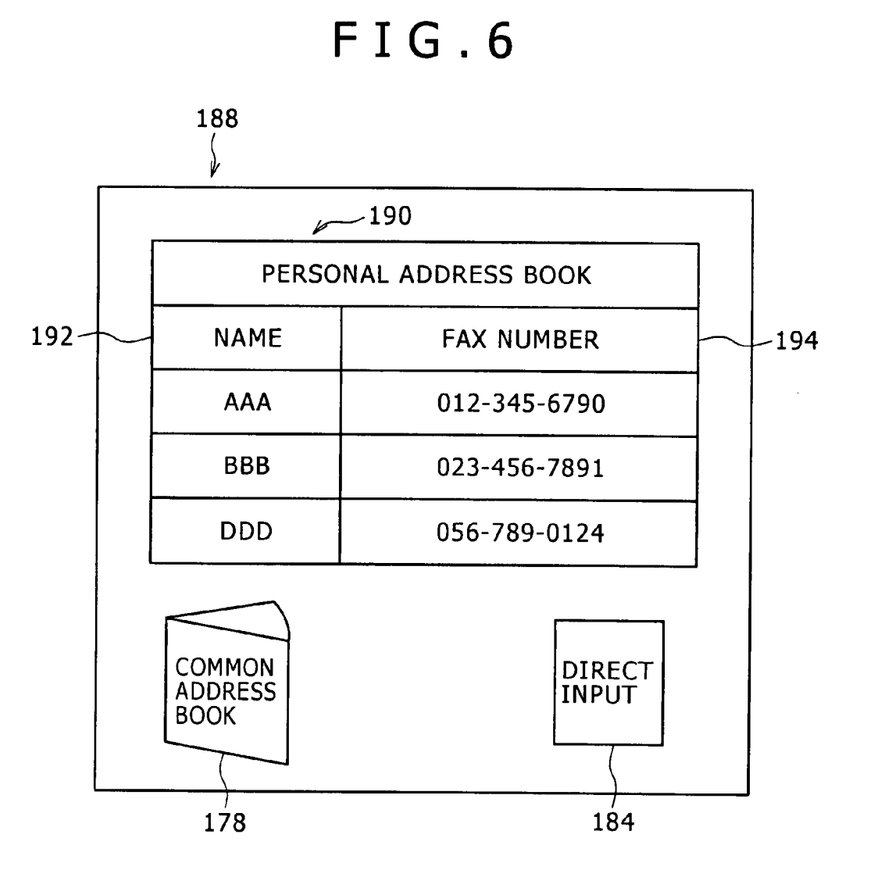
FIG. 6 illustrates another example of display on the UI screen.

FIG. 5 and FIG. 6 illustrate examples of display on the UI 104 of the image processing apparatus 20.

FIG. 5 shows a UI screen 170 which is displayed before the user starts transmission of an electronic document. In this UI screen 170, plural icons which are selectable by touch panel input are displayed. Icons 172, 174, 176 are, respectively, for setting transmission on FAX, transmission on non-encrypted e-mail, and transmission on encrypted e-mail for an electronic document to be transmitted. That is, when one of the icons 172, 174, 176 is selected, the screen changes to the selected one of the setting screens for transmission on FAX, transmission on non-encrypted e-mail, and transmission on encrypted e-mail.

Icons 178, 180, 184 displayed on the UI screen 170 are used, respectively, for selecting reference to a common address book, reference to a personal address book, and direct input by which a destination should be set. That is, when one of the icons 178, 180, 184 is selected, the screen changes to the selected one of the screens for common address book, personal address book and direct input. The icon 180 standing for personal address book is displayed with an annotation (note) 182 "NOT TO BE RECORDED IN LOG". This annotation indicates to the user that the address set as the destination is not recorded in the log.

FIG. 6 shows a screen to which the UI screen 170 shown in FIG. 5 changes, if the icon 172 standing for transmission on FAX and the icon 180 standing for personal address book are selected. Here, a personal address book 190 is displayed based on the personal address book 144 shown in FIG. 4. However, the personal address book 190 is made up of the entries in only the name 192 field and the FAX number 194 field. Specifically, among the addresses associated with the entry in the name 192 field, only the FAX number 194 entry that is an address settable for transmission on FAX is shown, and the entries of telephone number 152, mail address 156, and public key certificate 158 included in the personal address book 144 shown in FIG. 4 are not shown.

In the personal address book 190, only three ones of the four persons included in the personal address book 144 shown in FIG. 4 are shown. Specifically, the names AAA, BBB, and DDD of the persons who have FAX numbers are shown with the FAX numbers, but the name CCC of the person who does not have a FAX number is excluded from the display.

If the icon 176 standing for transmission on encrypted mail and the icon 180 standing for personal address book are selected, only the addresses in the rows 166 and 164 in which "issued" strings are registered for the public key certificate necessary for transmission on encrypted mail will be displayed, based on the personal address book 144 shown in FIG. 4.

In the UI screen 188, an icon 178 for selecting common address book and an icon 184 for selecting direct input are also displayed. If the user cancels the selection from the personal address book 190 or after finishing the selection from the personal address book 190, by selecting the icon 178 or the icon 184, setting the destination from the common address book or by direct input can be performed.

Figure 7:
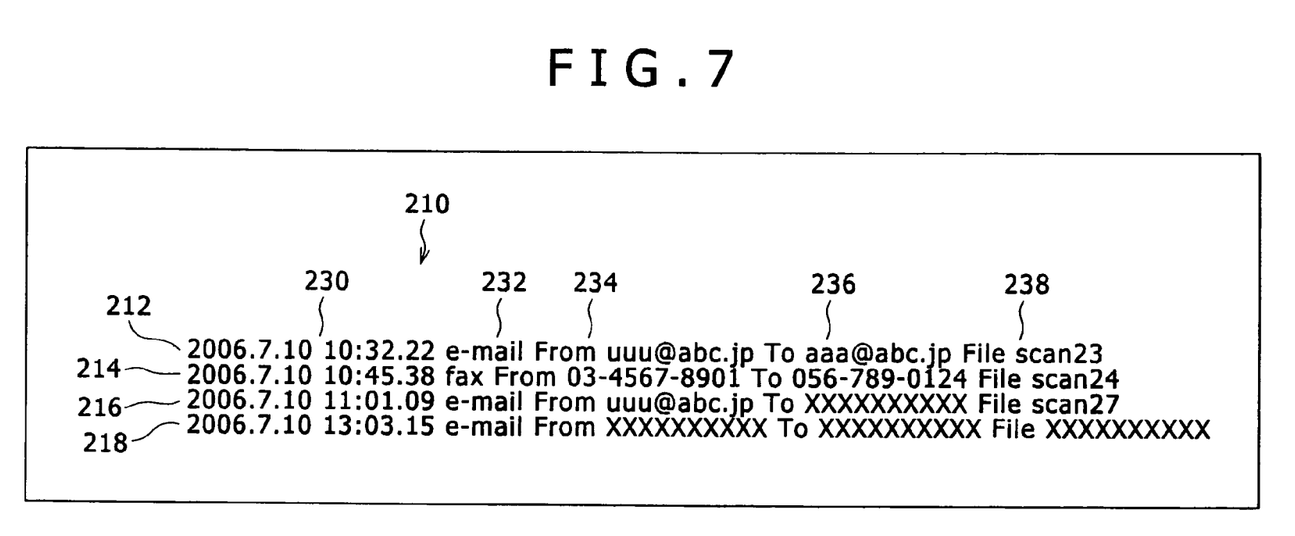
FIG. 7 illustrates an example of a log.

FIG. 7 illustrates an example of a log 210 created by the log creation part 110. In the log 210 shown, the records of four transmissions identified by reference numerals 212, 214, 216, 218 are presented.

Each transmission record in the log 210 is composed of the following items: date/time 230, transmission protocol 232, source 234, destination 236, and e-document transmitted 238. For example, for a transmission identified by reference numeral 212, the following is recorded: at date/time "2006.7.10, 10:32:22", via transmission protocol "e-mail", from source "uuu@abc.jp" to destination "aaa@abc.jp", a scanned document assigned ID "scan23" is transmitted as an electronic document. Similarly, for a transmission identified by reference numeral 214, the items including transmission protocol "fax" are recorded.

However, for a transmission identified by reference numeral 216, a null value "XXXXXXXXXX" is recorded for the destination item. This means that the destination of this transmission is selected from a personal address book and the selected address is concealed.

For a transmission identified by reference numeral 218, null values "XXXXXXXXXX" are recorded not only for the destination, but also for the source and transmitted e-document file name. The source and transmitted e-document file name are also concealed.

As the source, particularly for transmission on e-mail, an address unique to each user is set. As an electronic document to be transmitted, an electronic document owned by the user may be used instead of a scanned document.

A situation in which different demands exist for protection of private information may be, for example, a case where the image processing apparatus 20 is installed at a convenience store. In this case, it is believed that users have a high propensity to give more importance to anonymity of private information than a correct log display (log record). Among levels of protection of private information, change from one to another may be made by a command from a privileged user. Examples of modes that can be changed may include, inter alia, a mode in which no protection of private information is provided, a mode in which only the destination is protected, and a mode in which the source and transmitted e-document information as well as the destination are protected.

While an actual value is replaced by a null string "XXXXXXXXXX" in the log example presented in FIG. 7, manners in which substitute string is not described and manners in which an actual value is encrypted may be used. The encryption is, for example, performed such that it can be decrypted by the transmitting user or privileged user, but cannot be decrypted by other general users.

In the above description, an example of concealing information included in a log of a transmitted e-document has been discussed. However, logs can be created for various operations and information to be concealed can be set in different ways. For example, when an e-mail for reporting that transmission on FAX has been completed is sent to a PC user or the like who has instructed the transmission on FAX, this e-mail may be recorded into a log. The source, destination or the transmission event itself may be concealed in the log. Other than e-document transmission, for example, operations on electronic documents and paper documents may be logged. In particular, examples of such operations may be operations involving conversion between e-document and paper document, such as scan, print, and copy (a series of scan and print operations). Examples of operations on electronic documents may include, inter alia, character recognition processing (converting image data into character code, which may be called OCR processing including reading data from a paper document), editing and manipulating e-documents, storing e-documents in storage locations, and reading e-documents from storage locations.

As an example of setting information to be concealed, when a user who is authenticated and logged in performs an operation, information about this user may be concealed from a log of the operation. For example, when a user logged into an image processing device equipped with a copy function issues a copy instruction, the user name, the number of copies, etc. may be concealed.

The above-described exemplary embodiment may be changed in various ways.

Figure 8:
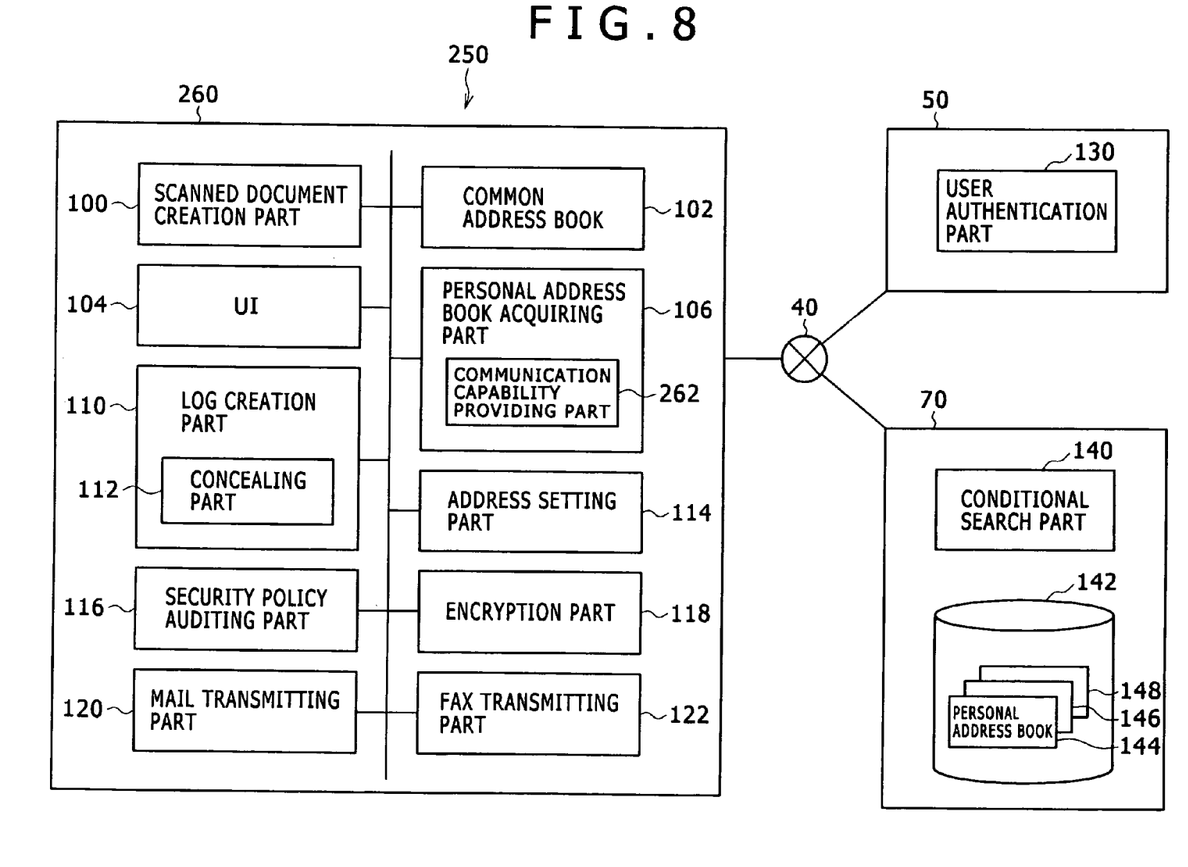
FIG. 8 is a block diagram to explain an example of modification to the arrangement of functions in the information processing system.
Figure 9:
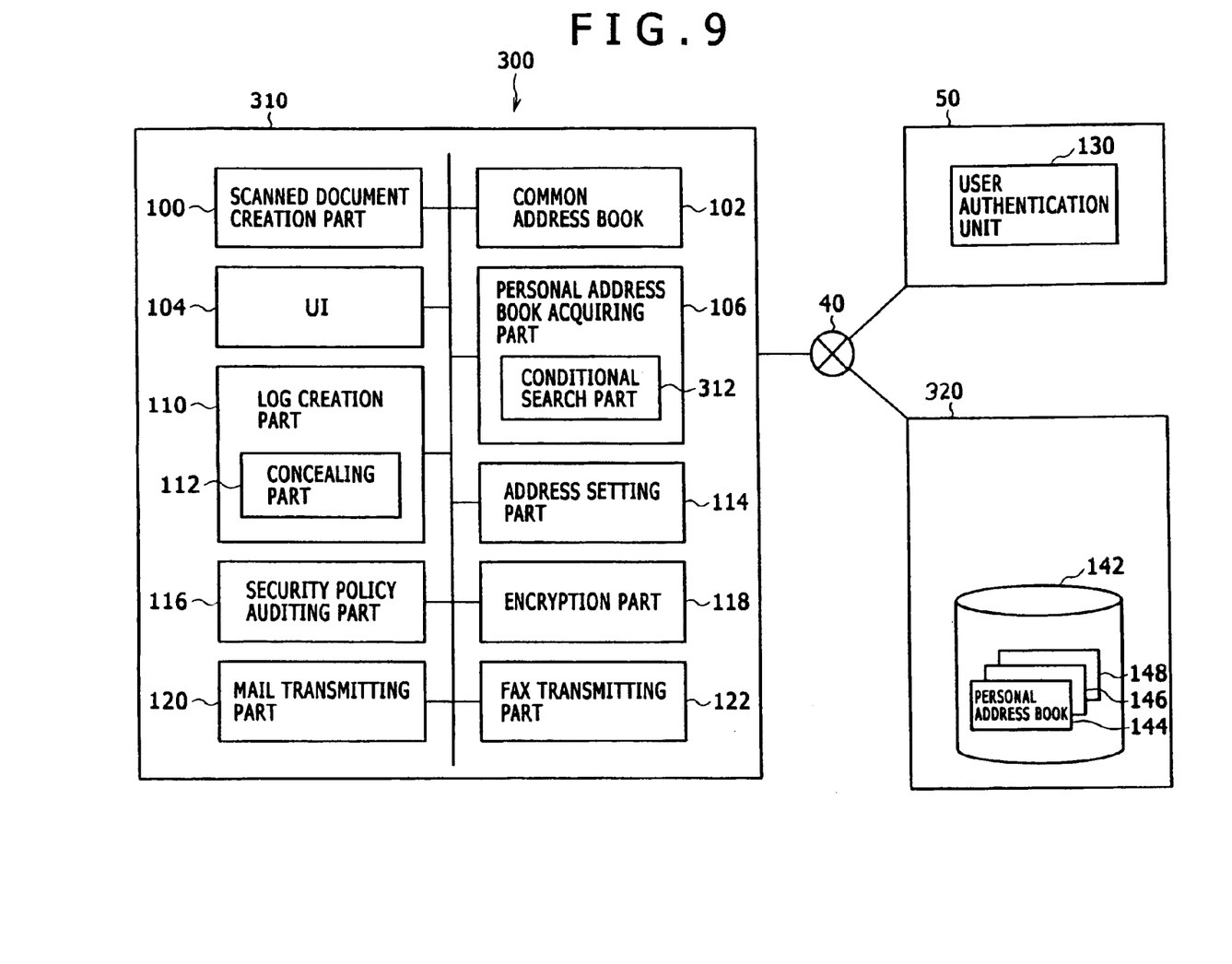
FIG. 9 is a block diagram to explain another example of modification to the arrangement of functions in the information processing system.

Here, by means of FIG. 8 and FIG. 9, when acquiring a personal address book, alternative manners of retrieving addresses which are settable as a destination are described as modification examples. Both FIG. 8 and FIG. 9 correspond to FIG. 2 and the same or corresponding components are assigned the same reference numbers and their descriptions are omitted or briefed.

In an information processing system 250 shown in FIG. 8, an image processing apparatus 260 is present instead of the image processing apparatus 20 in the information processing system 10 shown in FIG. 2. In this image processing apparatus 260, a communication capability providing part 262 is present instead of the condition providing part 108 in the personal address book acquiring part 106. The communication capability providing part 262 transmits information about transmission services which can be performed by the image processing apparatus 260 to the personal address book server 70. Specifically, instead of condition information depending on which transmission protocol has been selected, whether a command for encrypted communication has been issued, and what security policies are set, information about the transmission capabilities that the image processing apparatus 260 has is transmitted to the personal address book server 70. Examples of transmission capabilities may include, inter alia, information as to whether diverse protocols such as FAX transmission and e-mail transmission are supported in hardware or software and information as to whether communication using public key cryptosystem is supported in software.

The transmission capabilities are fixed at the factory shipment of the image processing apparatus 260 and when software (programs) are installed or booted. Thus, as soon as the personal address book server 70 is identified or as soon as a personal address book from which addresses are retrieved is identified, the communication capability providing part 262 can provide the transmission capabilities to the personal address book server 70. At the personal address book server 70, as soon as the transmission capabilities are provided thereto, a set of addresses which are settable as a destination under the transmission capabilities can be retrieved.

Alternatively, in an image processing apparatus 310 in an information processing system 300 shown in FIG. 9, a conditional search part 312 is present instead of the condition providing part 108 in the personal address book acquiring part 106. The conditional search part 140 is not present on a personal address book server 320 unlike the personal address book server 70 shown in FIG. 2. Instead, the conditional search part 312 creates a search formula based on the condition to be met by addresses which are settable as a destination and searches the address book storing part 142 stored on the personal address book server 320. The conditions to be met by addresses settable as a destination may include, inter alia, a condition that addresses are used for a user-selected transmission protocol as described for the example of FIG. 2, a condition as to whether encrypted communication is enabled, and a condition of satisfaction of security policies. The transmission capability information described using FIG. 8 may be set as a condition and search may be performed.

These exemplary embodiments can further be modified. In the above description, an instance where a scanned document is transmitted as an electronic document has been discussed; however, electronic documents other than a scanned document may be transmitted. Examples of such electronic documents may include, inter alia, a variety of files acquired via the Internet 40 (such as, e.g., text files, word-processing software files, numerical software files, and image files) and a text file made up of character strings which have been input to the image processing apparatus 20 directly. Electronic documents refer to electronic data that can be displayed or printed, regardless of types of data formats (file formats), whether the data includes characters, whether the data includes drawings, etc. By printout on paper, based on an electronic document, a paper document corresponding to the electronic document can be created. Inversely, by scanning a paper document, an electronic document corresponding to the paper document can be created.

Although FAX and e-mail (including encrypted e-mail) are mentioned as examples of transmission protocols in the above exemplary embodiment, other transmission protocols may be applied. In particular, other examples may include, inter alia, iFAX communication (e-mail transmission up to a relay server and subsequently changing to FAX), HyperText Transfer Protocol (HTTP) communication, and File Transfer Protocol (FTP) communication.

Although the image processing apparatus 20 is discussed as an example of an information processing apparatus in the above exemplary embodiment, the information processing apparatus may be a general-purpose computer such as PC. The information processing apparatus may be configured in a single unit of hardware or may be configured in plural units of hardware interconnected so the units can be communicated with each other.

Further exemplary embodiments are described below. However, some of these exemplary embodiments are included in the above exemplary embodiment.

In an exemplary embodiment, an information processing apparatus may include a transmission setting unit that sets transmission of an electronic document based on information relevant to a user, a transmitting unit that transmits the electronic document, and a log creation unit that creates a log of the transmission in which some or all of the information relevant to the user is concealed inaccessibly to some or all of other users. In an exemplary embodiment, contact address information is stored in a contact address book (personal address book) owned by the user. Thus, it is possible to improve protection of the contact address information stored in the contact address book.

In an exemplary embodiment, the personal address book may be a local address book stored in the apparatus or may be a remote address book stored on a remote machine. In the latter case, the same address book can be acquired, even if plural image processing apparatuses are used.

In an exemplary embodiment, contact address information is directly entered by the user. Thus, it is possible to increase the level of protection of the directly entered contact address information.

In an exemplary embodiment, private information other than contact address information is protected. An example hereof is to conceal the source and the transmitted e-document file name, like a transmission identified by reference numeral 218 exemplified in FIG. 7. As another example, when a part or all of a transmitted electronic document is recorded or when an account for paying charges for the transmission is recorded, these records may be concealed.

In an exemplary embodiment, the user can make the UI display a transmission log. Thus, it is possible to check the transmission status.

In an exemplary embodiment, as a condition to be met by addresses which are settable for a destination, an example is presented in which a condition that a public key certificate associated with contact address information can be acquired is set. Thus, it is possible to exclude contact address information for which encryption by public key cryptosystem is difficult from the presentation to the user.

In an exemplary embodiment, a contact address book storing device can be provided which includes a storage unit that stores a contact address book containing plural entries of contact address information, which is owned by a user, an acquisition unit that acquires a condition for retrieving contact address information which is settable for a destination of an electronic document from an information processing apparatus equipped with an electronic document transmitting unit, and an output unit that retrieves contact address information which satisfies the condition from the contact address book and outputs the contact address information to the information processing apparatus.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An information processing apparatus, comprising:
    a transmission setting accepting unit that accepts a transmission setting for an electronic document to be transmitted;
    a transmitting unit that transmits the electronic document based on the transmission setting;
    a setting unit that sets an item from information used in transmitting the electronic document as an item not to be included in a transmission log;
    a log creation unit that creates the transmission log including an item that has not been set as the item not to be included in the transmission log by the setting unit from the information used in transmitting the electronic document; and
    a memory unit that memorizes the transmission log created by the log creation unit, wherein
    the transmission log is a record of transmitting the electronic document, and created after transmitting the electronic document.

2. The information processing apparatus according to claim 1, wherein the item not to be included in the transmission log, which is set by the setting unit, is information of a destination of the transmitted electronic document.

3. The information processing apparatus according to claim 2,
    wherein the transmission setting accepting unit includes:
    a presentation unit that presents to a user contact address information satisfying a condition to be met by addresses settable for a destination from among contact address information pieces contained in a contact address book owned by a user who has specified the transmission setting; and
    an accepting unit that accepts contact address information selected by the user from the presented contact address information as the destination.

4. The information processing apparatus according to claim 3,
    wherein the condition to be met by addresses settable for a destination is a condition that transmission to a contact address from the information processing apparatus is set enabled or a condition that transmission to a contact address is not set disabled.

5. The information processing apparatus according to claim 3,
    wherein the condition to be met by addresses settable for a destination is a condition that a contact address format is used for a communication protocol set by the transmission setting.

6. The information processing apparatus according to claim 3,
    wherein the condition to be met by addresses settable for a destination is a condition that the contact address can be used for any communication which can be performed by the information processing apparatus.

7. The information processing apparatus according to claim 1, wherein the item not to be included in the transmission log, which is set by the setting unit, includes information of a source of the transmitted electronic document.

8. The information processing apparatus according to claim 1, wherein the item not to be included in the transmission log, which is set by the setting unit, includes information identifying the transmitted electronic document.

9. The information processing apparatus according to claim 1,
    wherein the transmitting unit transmits the electronic document on facsimile;
    the information processing apparatus includes a report e-mail transmitting unit that transmits an e-mail to report that the document has been transmitted on facsimile to a user who has specified the transmission setting; and
    the item not to be included in the transmission log, which is set by the setting unit, includes information relevant to the e-mail transmission.

10. The information processing apparatus according to claim 1, further comprising:
    an indication unit that indicates that information is concealed in the transmission log to a user of the information processing apparatus, before accepting the transmission setting.

11. The information processing apparatus according to claim 1, further comprising:
    a display that explicitly displays whether or not information which can be used in setting a transmission is not to be included in the transmission log, before accepting the transmission setting.

12. The information processing apparatus according to claim 1, further comprising:
    a reading device that scans a paper document and creates an electronic document,
    wherein the electronic document to be transmitted is the electronic document created by the reading device.

13. An information processing apparatus, comprising:
    a transmission setting accepting unit that accepts a transmission setting for an electronic document to be transmitted;

a transmitting unit that transmits the electronic document based on the transmission setting;
a setting unit that sets an item from information used in transmitting the electronic document as an item not to be included in a transmission log;
a log creation unit that creates the transmission log including an item that has not been set as the item not to be included in the transmission log by the setting unit from the information used in transmitting the electronic document; and
a memory unit that memorizes the transmission log created by the log creation unit, wherein
the transmission log is a record of transmitting the electronic document, and created after transmitting the electronic document,
the item not to be included in the transmission log, which is set by the setting unit, is information of a destination of the transmitted electronic document,
the transmission setting accepting unit includes:
  a presentation unit that presents to a user contact address information satisfying a condition to be met by addresses settable for a destination from among contact address information pieces contained in a contact address book owned by a user who has specified the transmission setting; and
  an accepting unit that accepts contact address information selected by the user from the presented contact address information as the destination, and
the presentation unit transmits the condition to be met by addresses settable for a destination to a device having a database from which contact addresses should be acquired and acquires contact address information retrieved at the device.

14. An information processing apparatus, comprising:
a transmission setting accepting unit that accepts a transmission setting for an electronic document to be transmitted;
a transmitting unit that transmits the electronic document based on the transmission setting;
a setting unit that sets an item from information used in transmitting the electronic document as an item not to be included in a transmission log;
a log creation unit that creates the transmission log including an item that has not been set as the item not to be included in the transmission log by the setting unit from the information used in transmitting the electronic document; and
a memory unit that memorizes the transmission log created by the log creation unit, wherein
the transmission log is a record of transmitting the electronic document, and created after transmitting the electronic document,
the item not to be included in the transmission log, which is set by the setting unit, is information of a destination of the transmitted electronic document,
the transmission setting accepting unit includes:
  a presentation unit that presents to a user contact address information satisfying a condition to be met by addresses settable for a destination from among contact address information pieces contained in a contact address book owned by a user who has the specified transmission setting; and
  an accepting unit that accepts contact address information selected by the user from the presented contact address information as the destination, and
the presentation unit searches a database on a device from which contact addresses should be acquired, based on the condition to be met by addresses settable for a destination, and acquires contact address information retrieved by the search.

15. An information processing system, comprising:
the information processing apparatus according to claim 3; and
a contact address book storing device that is connected to the information processing apparatus so as to be able to communicate with the information processing apparatus and stores the contact address books,
the presentation unit acquiring contact address information settable for a destination from the contact address book storing device.

16. A non-transitory computer readable medium storing a computer readable program executable by a computer for causing the computer to execute a process comprising:
accepting a transmission setting for an electronic document to be transmitted;
transmitting the electronic document based on the transmission setting;
setting an item from information used in transmitting the electronic document as an item not to be included in a transmission log;
creating the transmission log including an item that has not been set as the item not to be included in the transmission log by the setting step from the information used in transmitting the electronic document, wherein
the transmission log is a record of transmitting the electronic document, and created after transmitting the electronic document.

17. An information processing method, comprising:
accepting a transmission setting for an electronic document to be transmitted;
transmitting the electronic document based on the transmission setting;
setting an item from information used in transmitting the electronic document as an item not to be included in a transmission log; and
creating the transmission log including an item that has not been set as the item not to be included in the transmission log by the setting step from the information used in transmitting the electronic document, wherein
the transmission log is a record of transmitting the electronic document, and created after transmitting the electronic document.

18. An information processing system, comprising:
a memory that stores information which is used in transmission of an electronic document;
a transmission setting accepting unit that accepts a transmission setting for the electronic document to be transmitted by referring to the information stored in the memory;
a transmitting unit that transmits the electronic document based on the transmission setting;
a setting unit that sets an item from the information used in transmitting the electronic document as an item not to be included in a transmission log;
a log creation unit that creates the transmission log including an item that has not been set as the item not to be included in the transmission log by the setting from the information used in transmitting the electronic document, wherein the transmission log is a record of transmitting the electronic document, and created after transmitting the electronic document.

19. A non-transitory computer readable medium storing a computer readable program executable by a computer for causing the computer to execute a process comprising:

accepting a copy instruction from an authenticated user;
performing a copy operation based on the accepted instruction;
setting an item from information used in copying the electronic document as an item not to be included in a copying log; and
creating the copying log including an item that has not been set as the item not to be included in the copying log by the setting step from the information used in copying the electronic document, wherein
the copying log is a record of copying the electronic document, and created after copying the electronic document.

20. A non-transitory computer readable medium storing a computer readable program executable by a computer for causing the computer to execute a process comprising:
accepting an operation setting for an electronic document or a paper document;
executing the accepted operation;
setting an item from information used in executing the accepted operation of the electronic document or paper document as an item not to be included in an execution log;
creating the execution log including an item that has not been set as the item not to be included in the execution log by the setting step from the information used in executing the accepted operation of the electronic document or paper document, wherein
the execution log is a record of executing the accepted operation of the electronic document or paper document, and created after executing the accepted operation of the electronic document or paper document.

21. An information processing apparatus, comprising:
a transmission setting accepting unit that accepts a transmission setting for an electronic document to be transmitted;
a transmitting unit that transmits the electronic document based on the transmission setting;
a setting unit that sets an information item of a plurality of information items used in transmitting the electronic document as an information item not to be included in a transmission log;
a log creation unit that creates the transmission log including remaining information items of the plurality of information items used in transmitting the electronic document and not including the information item of the plurality of information items set as the information item not to be included in the transmission log, the remaining information items having not been set as the information item not to be included in the transmission log by the setting unit; and
a memory unit that memorizes the transmission log created by the log creation unit, wherein
the transmission log is a record of transmitting the electronic document, and created after transmitting the electronic document.

* * * * *